April 11, 1961  N. W. KISH  2,979,076
COMBINED WRENCH, LOCK, HOOD AND INDICATOR FOR VALVES
Filed Jan. 17, 1957
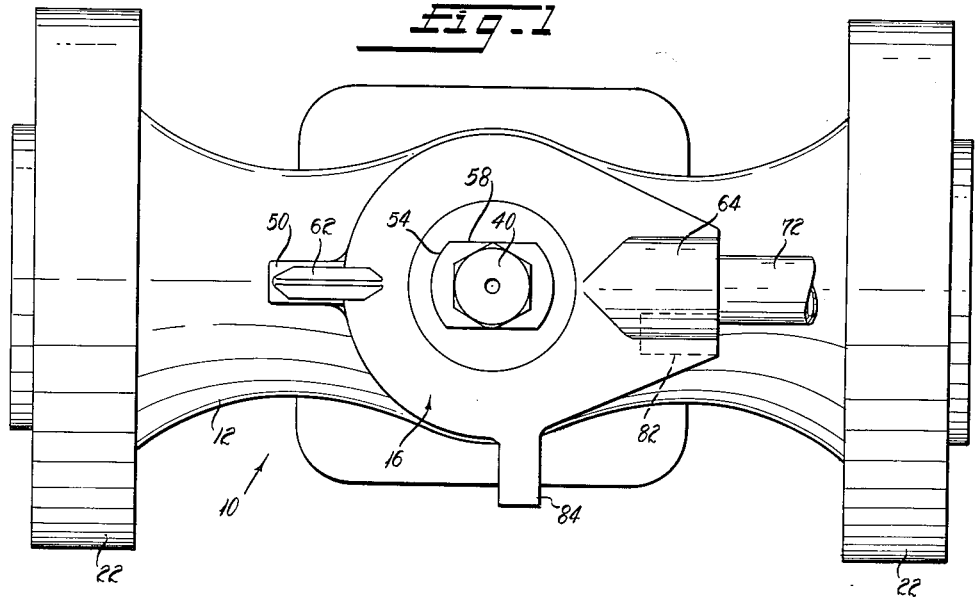
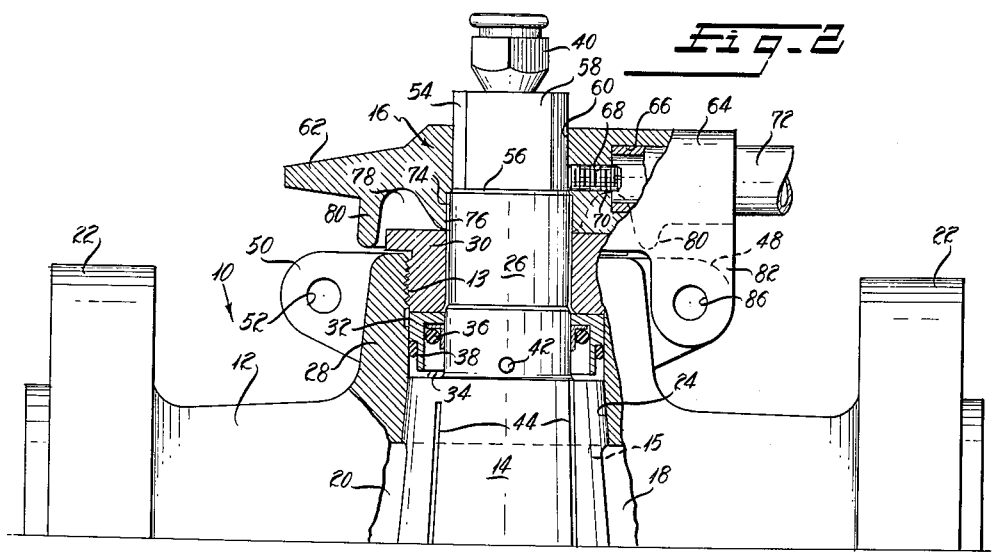
INVENTOR
NICHOLAS W. KISH
BY Strauch, Nolan & Neale
ATTORNEYS United States Patent Office 2,979,076
Patented Apr. 11, 1961

2,979,076

COMBINED WRENCH, LOCK, HOOD AND INDICATOR FOR VALVES

Nicholas W. Kish, Barberton, Ohio, assignor to Rockwell Manufacturing Company, Pittsburgh, Pa., a corporation of Pennsylvania Filed Jan. 17, 1957, Ser. No. 634,638

2 Claims. (Cl. 137—382)

This invention relates to plug valve assemblies and more particularly to a combined wrench, plug locking member, stem packing gland hood and indicator whereby the valve can be locked in open or closed positions, provide an indication of the valve plug position and entrance of foreign matter into the space between valve stem and packing is prevented.

Although devices have previously been proposed as combined plug valve wrenches and locks, they have attempted to include the handle integral with the wrench, and the devices are cumbersome and often involve complex casting operations and some even require removal from the valve during each operation. None of the previously used devices involve the simple cooperative structure of this invention to provide a combination wrench, plug stop, lock, hood and condition indicator for the valve.

In the present invention, a plug valve body is provided with apertured stop lugs adjacent the valve stem packing and a single member, having a hooded shape, is formed to slip over and non-rotatably engage with the valve operating stem above the stem packing. A skirt portion of the hooded member overlaps the packing gland to provide an effective restraint against entry of dirt, dust and water to the space where the valve stem passes through the gland. Integral, dependent, apertured lug members on the periphery of the hooded member cooperate with the valve body lugs to provide valve plug limit stops in the valve open and closed positions. A lock can be placed through adjacent apertured hood member and valve body lugs in either position of the valve plug to maintain the wrench on the plug stem and to lock the valve plug in a desired position. An integral pointer on the hood member conveniently indicates whether the valve is open or closed.

Accordingly, a primary object of this invention resides in providing a novel combined wrench and locking member for use in cooperation with a plug valve stem and body to enable valve operation and a convenient manner of locking the valve plug in a desired position.

A further object resides in the provision of a simple unitary casting which in a novel manner combines a valve wrench, hood and plug stop device for use on a plug valve. Also contemplated with this object is the additional feature of providing a means of locking the valve plug in desired positions.

Another object resides in providing a plug valve body having a projecting plug operating stem with a novel unitary valve wrench, packing gland hood, and locking device fitted on the plug stem and cooperating with portions of the valve body to define limit positions of the plug and also to enable the wrench and plug position to be locked relative to the valve body.

Further novel features and other objects of this invention will become apparent from the following detailed description, discussion and the appended claims taken in conjunction with the accompanying drawings showing preferred structures and embodiments, in which:

Figure 1 is a top plan view of a plug valve assembly utilizing structure embodying the present invention;

Figure 2 is a partially sectioned side view of the stem portion of the plug valve shown in Figure 1, illustrating structural cooperation between the valve components and the unitary wrench, hood, and locking member; and Figure 3 is a side elevation view of the unitary wrench, hood and locking member.

A lubricated plug valve 10 with body 12 and an inverted plug 14 with a through port 15 is illustrated in combination with the unitary plug wrench, valve lock, gland hood and indicator 16. Valve body 14 is essentially of conventional construction, having inlet and outlet passages 18 and 20, end flanges 22 for suitable pipe line connections, and a tapered cross bore 24 for seating the tapered plug 14.

In the inverted form of tapered plug valve, the plug stem 26 is connected to the smaller diameter end of the plug 14 and the stem 26 may be integral with the plug, as shown, or separable. Plug 14 is inserted in bore 24 through the bottom of body 12 and urged into tight seating disposition by well known conventional means (not shown). Plug stem 26 projects from the top of body 12 through a packing gland containing boss 28 integral with valve body 12 and internally threaded at 13 to receive a rotatably adjustable gland nut 30 which has a free fit over the plug stem 26. Gland nut 30 retains a seal cartridge 32 over plug end shoulder 34 and the cartridge 32 maintains a plug shaft seal 36 around the shaft 26 and also retains a resilient O-ring seal 38 against the inner surface of boss 28. The present invention is applicable as well to plug valves having the plug stem on the large end of the plug.

Valve stem 26 is hollow and a lubricant fitting 40 is mounted in its end to enable introduction of lubricant under pressure through the stem 26 and cross passage 42 above the shoulder 34 at the small end of plug 14. Application of lubricant under pressure to the small plug end provides packing forces to unseat the valve plug 14 and lubricant will also pass into appropriate lubricating grooves 44 in the plug surface. Complete lubricant sealing of the plug 14 is enabled by additional lubricant grooves (not shown) in the plug 14 and valve body 12.

As part of this invention, the valve body boss 28 has two external integral lugs 48 and 50, diametrally oppositely positioned and radially projecting from its sides. Each lug 48 and 50 has a through hole 52 for the reception of a locking device, such as the shackle of a padlock, in cooperation with member 16 in a manner to be described. The top edges of lugs 48 and 50 are preferably no higher than the top end surface of boss 28.

The outer end 54 of plug stem 26 is slightly reduced in diameter from that of the main stem body to provide an annular shoulder 56 and is formed with flat sides 58, enabling wrench engagement for turning the stem and plug.

Member 16 is a one piece unitary structure having a flat sided non-circular central aperture 60 shaped to non-rotatably mount member 16 on the valve stem end 54, the flat sided aperture 60 providing a wrenching grip on the flat sides 58 of the stem. A pointer projection 62 extends from one side of the member 16 and, when the member 16 is engaged over the plug stem end 54, provides a radial indication parallel to the plug through port 15. Thus, as illustrated in Figures 1 and 2, when the valve plug 14 is disposed with its through port 15 aligned with valve body inlet and outlet passages 18 and 20, the pointer 62 points in a direction parallel to such through flow line indicating an open valve condition. When the member 16 with plug 14 is rotated ninety degrees (90°), the pointer will point transverse of the valve body 12 indicating a closed valve condition.

Also extending from the side of member 16, preferably opposite to pointer 62, is an enlarged integral boss 64 provided with a socket 66 disposed radially with respect to the center aperture 60. A hole 68, through the end wall of socket 66 to the center aperture 60, is coaxial with the socket 66 and is threaded to receive a set screw 70 which engages the end 58 of plug stem 26 and clamps member 16 to the plug stem. Socket 66, in the illustrated embodiment, has a round cross-section to receive the end of a tubular handle 72. Socket 66 and handle 72 may be of any suitable, similar cross-section, such as square, hexagonal, etc., and the handle may be a solid rod if desired.

The lower side of member 16, immediately adjacent the central aperture 60 has a shallow annular recess 74 that fits over the stem shoulder 56. Recess 74 is defined by an inner annular depending skirt 76 that extends to a position closely adjacent but slightly spaced above the top of gland nut 30 so as not to interfere with conventional jacking movement of the plug. The plug is shown in the seated position in Figure 2 and the space between members 76 and 30 is so slight as not to be shown. Vertical positioning of member 16 on stem 26 can be adjusted and maintained by the set screw 70. The underside of member 16 is relieved to provide a space 78 between the inner skirt 76 and an outer annular depending skirt 80 which overhangs the outer perimeter of gland nut 30 and extends in close proximity to the upper end of gland sleeve 28. Thus member 16 with inner aperture 60 providing a close sliding fit over stem end 54, inner skirt 76 providing an essentially complete barrier to the space between gland nut 30 and plug stem 26, and outer skirt 80 providing a lateral barrier to the upper end of boss 28, provides an excellent protective hood over the valve gland. The outer and inner skirts, 80 and 76, will effectively block penetration of dirt, dust and abrasive particles from exterior of the member 16 to the plug stem 26 above the gland nut 30. The hood skirts also provide a protective barrier against moisture from rain, snow and other weather.

To provide locking structure for cooperation with the valve body lugs 50 on boss 28, two depending apertured stop members 82 and 84 are integral with member 16. Both of the stop members 82 and 84 are positioned radially outward of the outer skirt 80, stop member 82 depending from under the socket boss 64 and stop member 84 projecting out and downwardly from the side of skirt 80. As viewed in Figure 1, stop member 82 is offset clockwise from a line through the pointer 62 and boss 64 and is positioned so that its flat right side face abuts the left side face of valve body lug 48 when the plug 14 is in valve open position. In such position the aperture 86 in stop member 82 aligns with the aperture in lug 48, enabling the shackle of a padlock (not shown) to be passed through lug 48 and stop member 82 to lock the member 16 on the valve body 12 and to also lock the valve plug 14 in valve open position.

Stop member 84 is located clockwise from stop member 82 and is offset toward stop member 82 from a position midway between boss 64 and pointer 62. When the member 16 is rotated clockwise from its position in Figure 1, the offset arrangement of stop member 84 will permit a ninety degree (90°) rotation until it abuts the valve body lug 50. In this position, the pointer 62 on member 16 will indicate that valve plug 14 is in a valve closed position and the aperture 86 in stop member 84 will align with the aperture 52 in lug 50 so the member 16 can be locked in the valve closed position in the same manner as described for the valve locked position.

The foregoing discloses a simple unitary plug valve operating wrench that effectively provides additional means to limit the plug position, lock the plug in position, provide an indication of the plug position and serves as an effective barrier against introduction of foreign matter into the space between the plug stem and the stem packing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve structure having a valve body having a gland receiving boss and a longitudinally adjustable packing gland therein, a rotatable valve plug having an operating valve stem extending through said packing gland to the exterior of said body, and circumferentially spaced stop means on the exterior of said boss, the improvement comprising a valve operating member formed with an aperture therein non-rotatably surrounding said valve stem and having an outer depending skirt disposed around a portion of and closely adjacent the packing gland, a relatively shorter inner depending skirt surrounding said valve stem in closely spaced relation above the upper end of the gland, two circumferentially spaced apart stop members projecting from said valve operating member outwardly of said outer skirt so as to cooperatively abut said stop means on the valve body in open and closed valve positions, and a projecting valve plug position indicator on said member in fixed circumferentially spaced relation to said stop members.

2. In the combination defined in claim 1, cooperating locking apertures in said stop means and said projecting stop members.

References Cited in the file of this patent

UNITED STATES PATENTS

| | | |
|---|---|---|
| 596,871 | Grist | Jan. 4, 1898 |
| 1,111,865 | Serrell | Sept. 29, 1914 |
| 1,123,858 | Deckebach | Jan. 5, 1915 |
| 1,615,181 | Swacker | Jan. 18, 1927 |
| 2,271,475 | Clade | Jan. 27, 1942 |
| 2,282,488 | MacClatchie | May 12, 1942 |
| 2,642,257 | Mueller et al. | June 16, 1953 |

FOREIGN PATENTS

| | | |
|---|---|---|
| 566,017 | France | Nov. 15, 1923 |
| 223,645 | Switzerland | Sept. 30, 1942 |